(12) United States Patent
Alexander

(10) Patent No.: US 8,714,237 B2
(45) Date of Patent: May 6, 2014

(54) METHOD AND MEANS FOR INSTALLING GEOTHERMAL HEAT LOOPS

(76) Inventor: Marshall T. Alexander, Gretna, NE (US)

( * ) Notice: Subject to any disclaimer, the term of this patent is extended or adjusted under 35 U.S.C. 154(b) by 460 days.

(21) Appl. No.: 13/065,287

(22) Filed: Mar. 18, 2011

(65) Prior Publication Data

US 2012/0234602 A1 Sep. 20, 2012

(51) Int. Cl.
*E21B 7/20* (2006.01)

(52) U.S. Cl.
USPC .............................. 165/45; 405/184; 166/302

(58) Field of Classification Search
USPC ............ 175/57; 405/174, 184, 184.4; 165/45; 166/302
See application file for complete search history.

(56) References Cited

U.S. PATENT DOCUMENTS

| | | | |
|---|---|---|---|
| 5,634,515 A | 6/1997 | Lambert | |
| 6,112,833 A | 9/2000 | Lambert | |
| 7,644,785 B2 | 1/2010 | Stevens | |
| 7,647,988 B2 | 1/2010 | Roussy | |
| 8,256,531 B1 * | 9/2012 | Biggs et al. | 175/15 |
| 2009/0065255 A1 | 3/2009 | Roussy | |
| 2010/0155141 A1 | 6/2010 | Roussy | |

* cited by examiner

*Primary Examiner* — David Andrews
(74) *Attorney, Agent, or Firm* — Dennis L. Thomte; Thomte Patent Law Office LLC

(57) ABSTRACT

A method is described for installing a geothermal heat loop in the ground so that the heat loop extends downwardly and outwardly into the ground from a pit dug in the ground. The method also includes the utilization of means for extending the heat loop through a drilled bore hole.

2 Claims, 8 Drawing Sheets

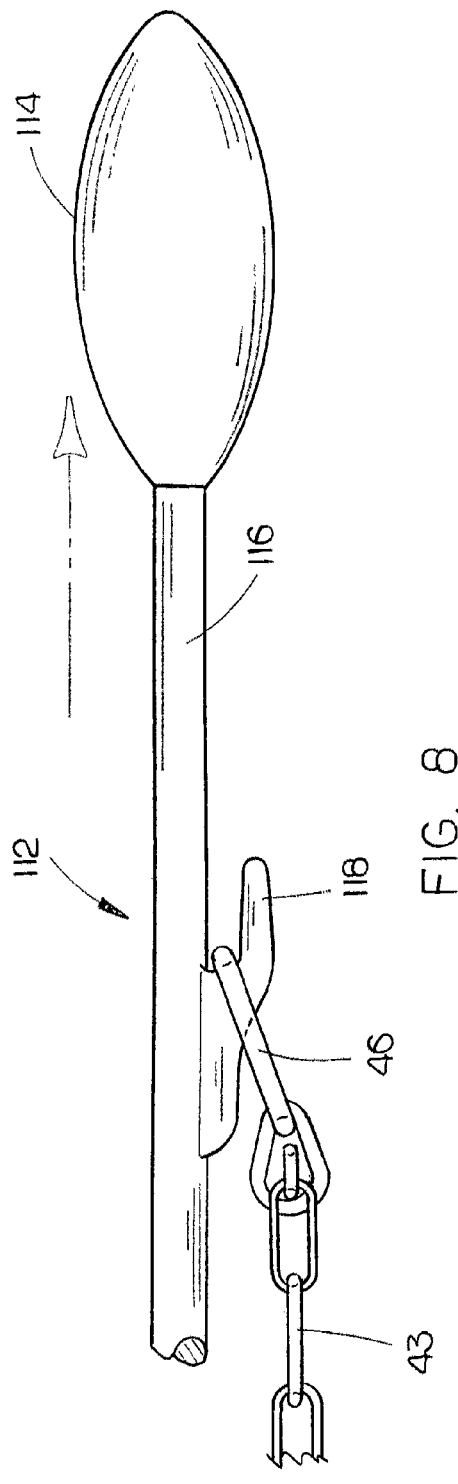
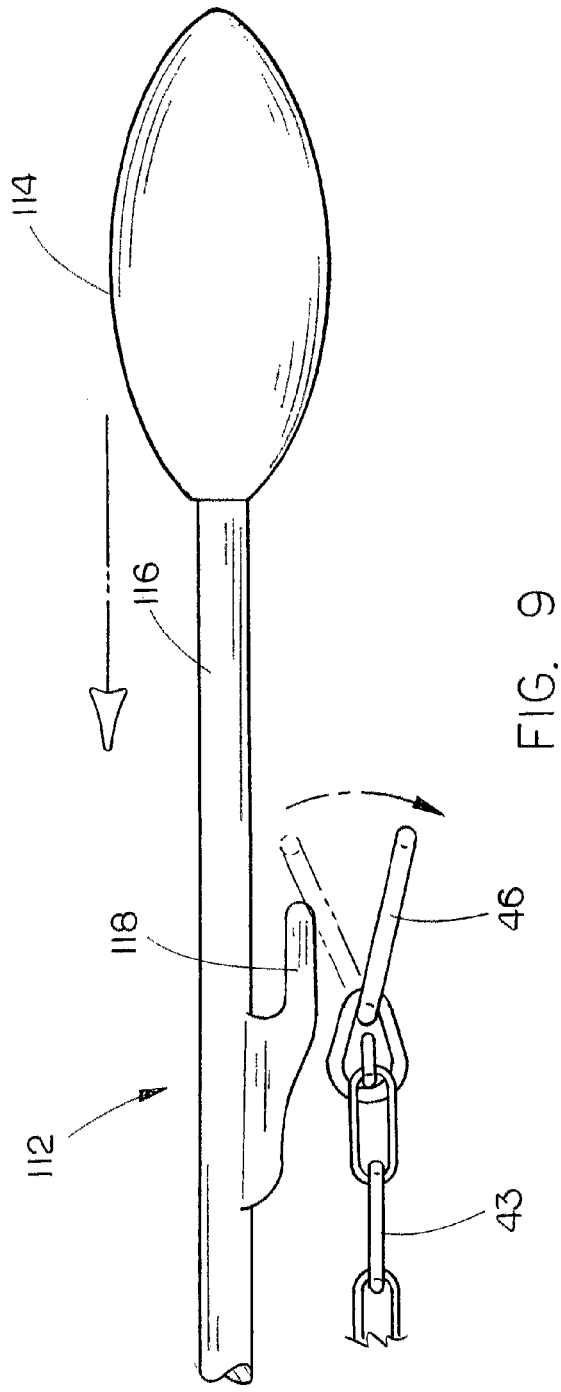

METHOD AND MEANS FOR INSTALLING GEOTHERMAL HEAT LOOPS

BACKGROUND OF THE INVENTION

1. Field of the Invention

This invention relates to a method and means for installing geothermal heat loops in the ground and more particularly to a method and means for installing geothermal heat loops in the ground wherein the heat loops extend downwardly and outwardly from a single pit.

2. Description of the Related Art

In geothermal heat loop installations, the heat loops are usually positioned in the ground in a vertical manner or a horizontal manner. In horizontal installations, a pit is dug in the ground. A plurality of spaced-apart bore holes are drilled which extend horizontally from the pit. A heat loop is then usually manually pushed through each of the bore holes with the "bend" or loop portion of the heat loop being at the distal end of the heat loop. The open ends of the heat loops are then connected to a manifold or the like which is usually positioned in the pit. In such an operation, it is difficult to manually push the heat loop through the bore hole due to the effort required to force the heat loops through the bore hole. Further, the length of the horizontal heat loop is restricted by the size of the lot in which the heat loops are being installed. In some cases, a pair of spaced-apart pits is used with the heat loops extending between the pits. The use of a pair of pits causes greater soil and vegetation disruption. Additionally, the horizontally extending bore holes may damage the root systems of trees or shrubs.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A method and means for installing geothermal heat loops in the ground is described. In the method of this invention, the heat loops are installed in the ground as follows:

(a) digging a pit in the ground;
(b) providing a bore hole drilling device including a plurality of drill pipes which may be selectively removably secured together in an end-to-end relationship to form a drill pipe string with a drill bit selectively removably secured to the distal end of the string;
(c) drilling a first elongated bore hole which extends from the pit downwardly and outwardly therefrom at an angle with respect to horizontal to a predetermined location;
(d) removing the drill pipe string and drill bit from the first bore hole;
(e) providing an elongated enlarged head member assembly having a hook-like member secured to one side thereof;
(f) attaching the head member assembly to the distal end of the drill pipe string;
(g) providing a geothermal heat loop including a pair of flexible pipes having proximal and distal ends;
(h) providing a dual coil fitting;
(i) connecting the dual coil fitting to the distal ends of the pair of flexible pipes to fluidly connect the same and to create a heat loop;
(j) connecting the dual coil fitting to the hook-like member on the head member assembly;
(k) moving the drill pipe string and the head member assembly through the first bore hole to a predetermined location which causes the dual coil fitting and the pair of flexible pipes attached thereto to be pulled through the first bore hole to the predetermined location;
(l) moving the drill pipe string and the head member assembly towards the pit which causes the dual coil fitting and the pair of flexible pipes attached thereto to disconnect from the hook-like member on the head member assembly leaving the dual coil fitting and the pair of pipes at the predetermined location;
(m) removing the drill pipe string from the first bore hole;
(n) drilling additional spaced-apart bore holes which extend downwardly and outwardly from the pit with a heat loop being installed in each of the bore holes as described above.

The means for installing the heat loop in the ground includes a head member assembly having an enlarged head portion and shaft, a hook-like member on the shaft of the head member assembly, a dual coil fitting secured to the distal end of a pair of heat loop pipes, and a means for attaching the dual coil fitting to the hook-like member on the shaft of the head member assembly.

It is therefore a principal object of the invention to provide an improved method and means for installing geothermal heat loops in the ground.

A further object of the invention is to provide a method and means for installing geothermal heat loops in he ground whereby the heat loops extend downwardly and outwardly from a single pit dug in the ground.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 8 is a partial perspective view illustrating the manner in which the attachment means for the dual coil fitting and heat loop pipes is attached to the shaft of the head member assembly; and FIG. 9 is a view illustrating the manner in which the withdrawal of the drill pipe string causes the head member assembly to disconnect from the attachment means.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
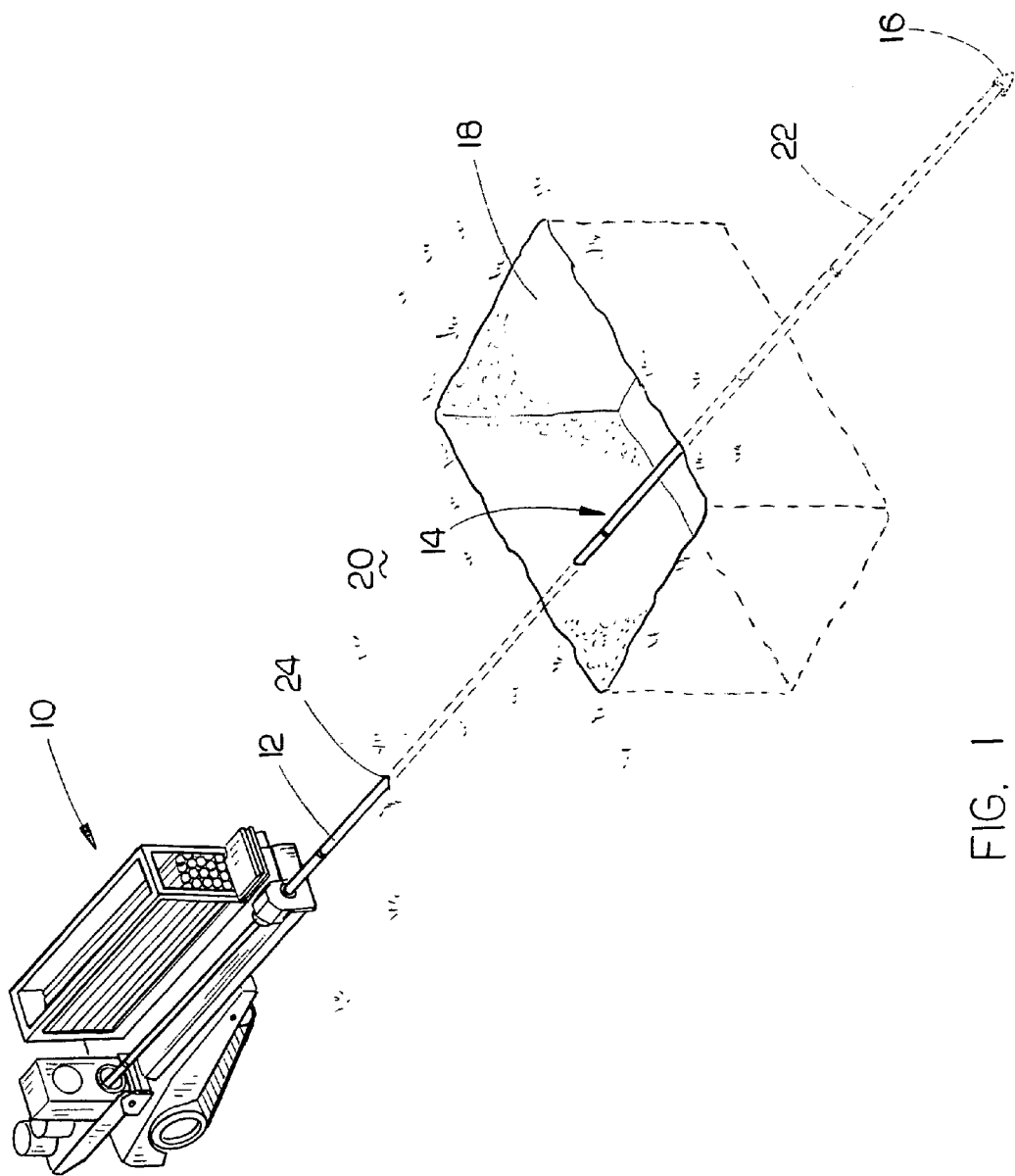
FIG. 1 is a perspective view illustrating a conventional bore hole drilling machine drilling a bore hole downwardly and outwardly from a pit dug in the ground.

In FIG. 1, the numeral 10 refers to a conventional bore hole drilling machine such as disclosed in U.S. Pat. No. 7,413,031 B2. The machine 10 utilizes a plurality of drill pipes 12 which are successively connected together in an end-to-end manner to create a drill pipe string 14 having a drill bit 16 at the distal end thereof. The numeral 18 refers to a pit which is dug in the ground 20. Preferably, the pit 18 is approximately four to five feet deep and has a transverse length of approximately eight feet and a width of four feet. The drilling machine 10 is operated to drill a bore hole 22 which extends downwardly and outwardly from a first location 24, through pit 18 to a predetermined location remote from the pit 18.

Figure 2:
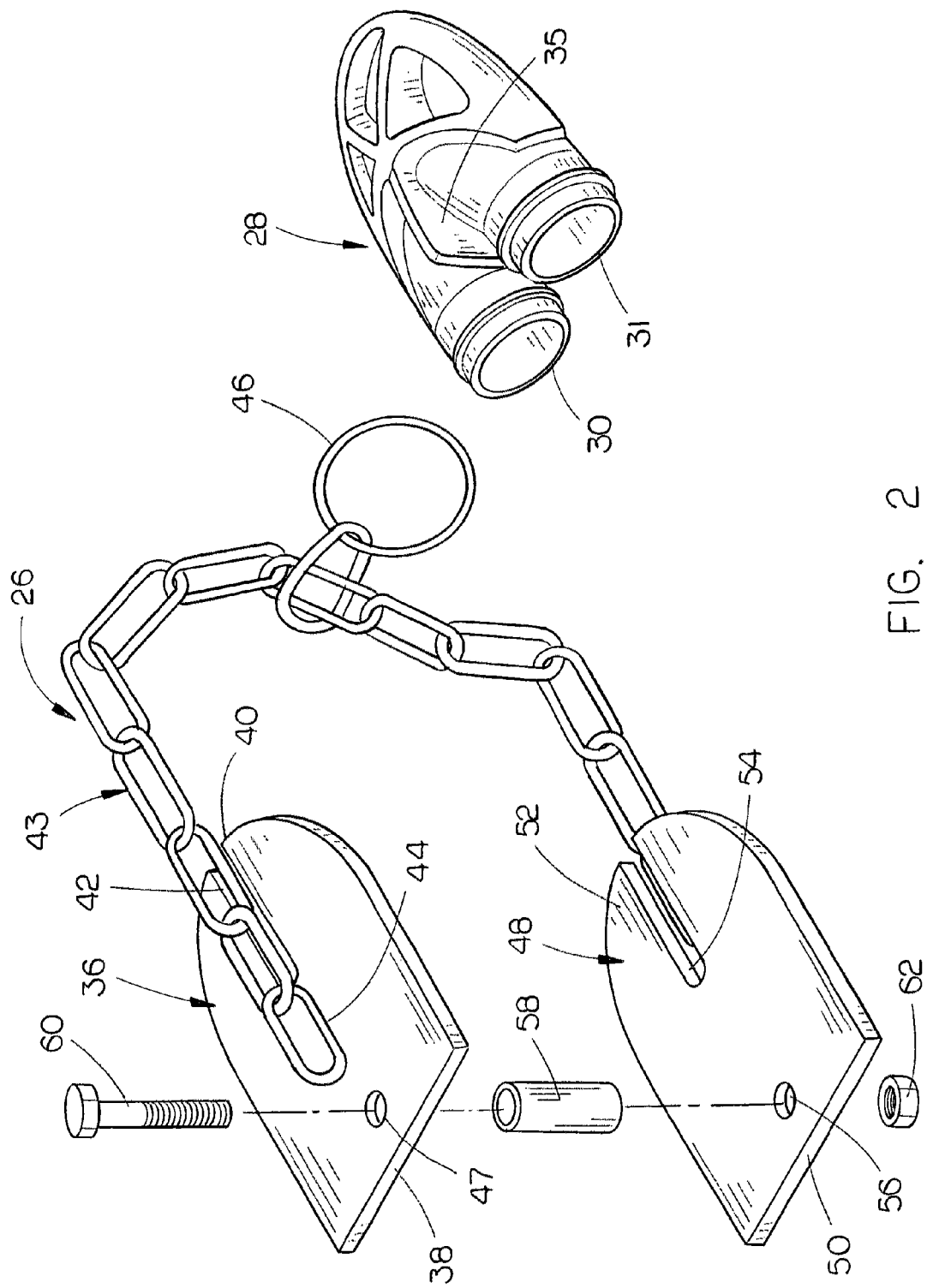
FIG. 2 is an exploded perspective view illustrating a first way of securing an attachment means to a dual coil fitting.
Figure 3:
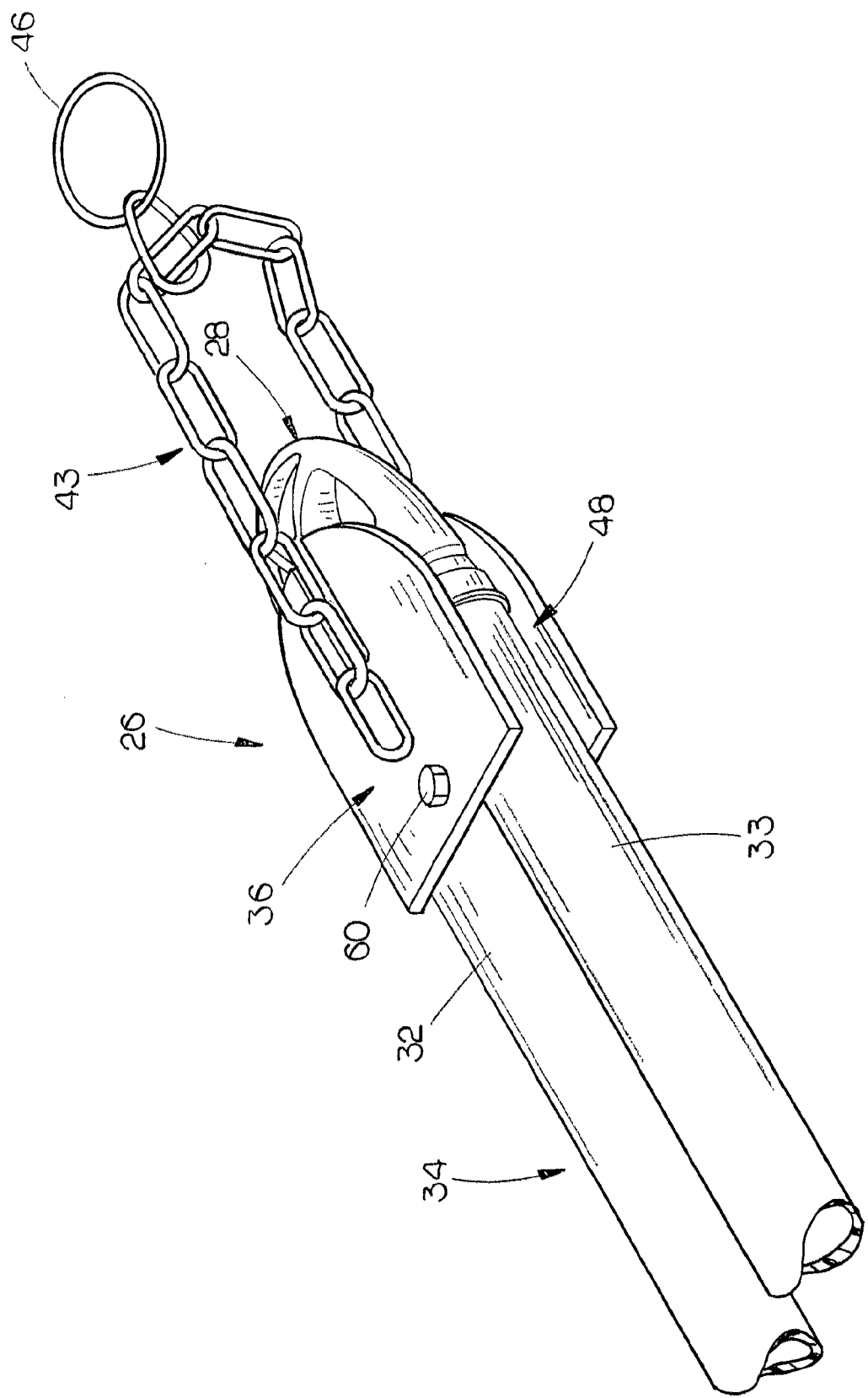
FIG. 3 is a perspective view illustrating the structure of FIG. 2 attached to a pair of heat loop pipes.

FIG. 2 illustrates a first attachment means 26 which is connected to a dual coil fitting or elbow 28 having tubular portions 30 and 31 which are fluidly connected together. Tubular portions 30 and 31 of dual coil fitting 28 are fluidly connected to heat loop pipes 32 and 33 respectively to form a heat loop 34. A preferred dual coil fitting is the dual coil fitting illustrated in U.S. Design Patent No. D488,486 which has a centrally positioned upstanding rib 35 at its upper side. Dual coil fitting 28 has an identical downwardly extending rib at its underside. Attachment means 26 includes an upper plate member 36 having a trailing or rearward end 38 and an arcuate leading or forward end 40. A slot 42 extends rearwardly into plate member 36 from the forward end 40 thereof. The numeral 43 refers to a flexible link-type chain having one end thereof welded or otherwise secured to the upper surface of plate member 36 at 44. A ring 46 is attached to chain 43 as seen in FIG. 2. Plate 36 has a bolt opening 47 formed therein adjacent the rearward end 38 as seen in FIG. 2.

The numeral 48 refers to a lower plate member having a trailing or rearward end 50 and an arcuate leading or forward end 52. A slot 54 extends rearwardly into plate member 48 from the forward end 52 thereof. The other end of chain 43 is welded or otherwise secured to the lower side of plate member 48 in the same manner as the chain 43 is secured to plate member 36. Plate member 48 has a bolt opening 56 formed therein adjacent its rearward end 50 as seen in FIG. 2. The numeral 58 refers to a hollow sleeve which is adapted to be positioned between plate members 36 and 48. Bolt 60 is extended downwardly through bolt opening 47, through sleeve 58 and through bolt opening 56. Nut 62 is adapted to be threadably mounted on the end of bolt 60.

Figure 4:
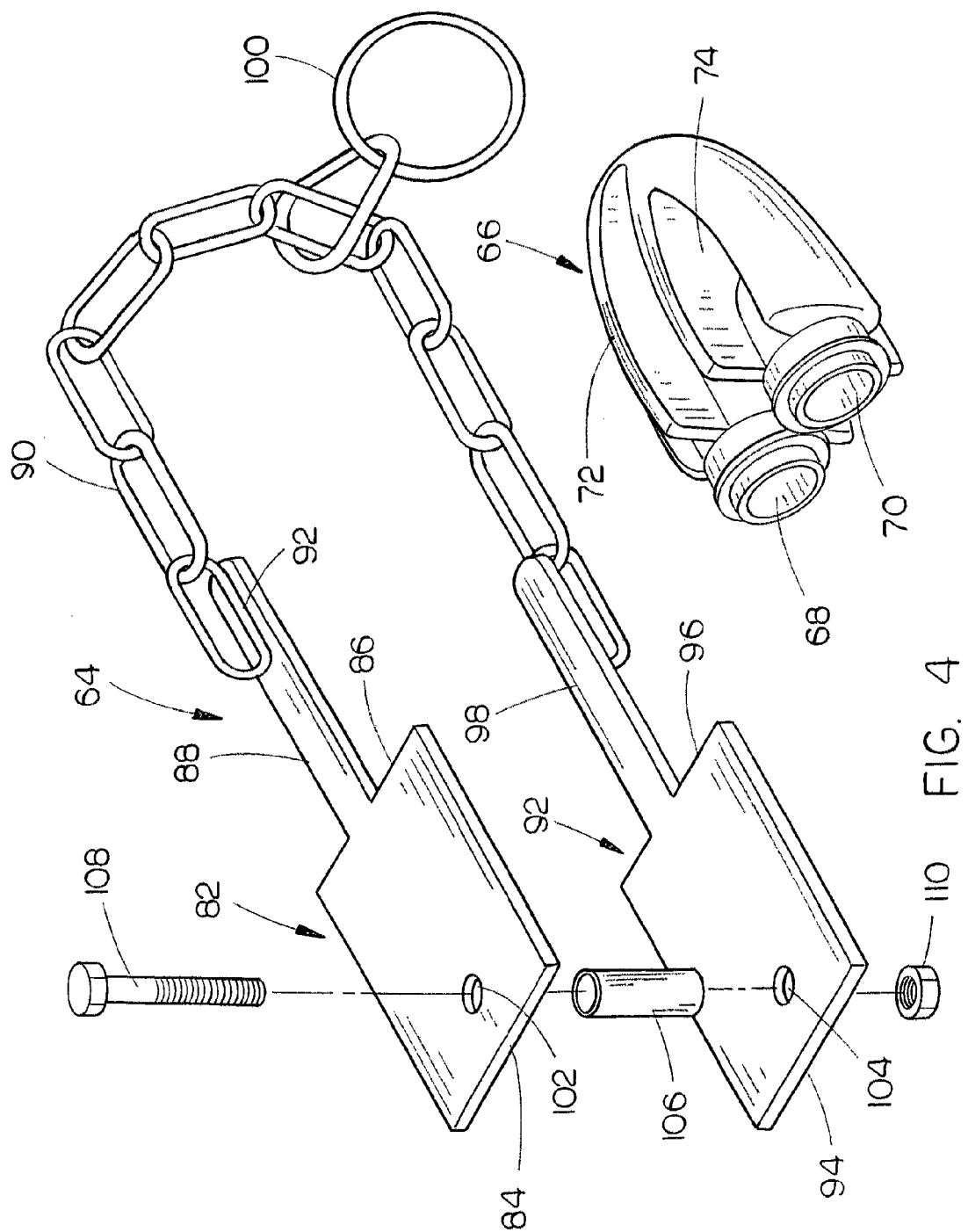
FIG. 4 is an exploded perspective view of a second way of securing an attachment means to a dual coil fitting.
Figure 5:
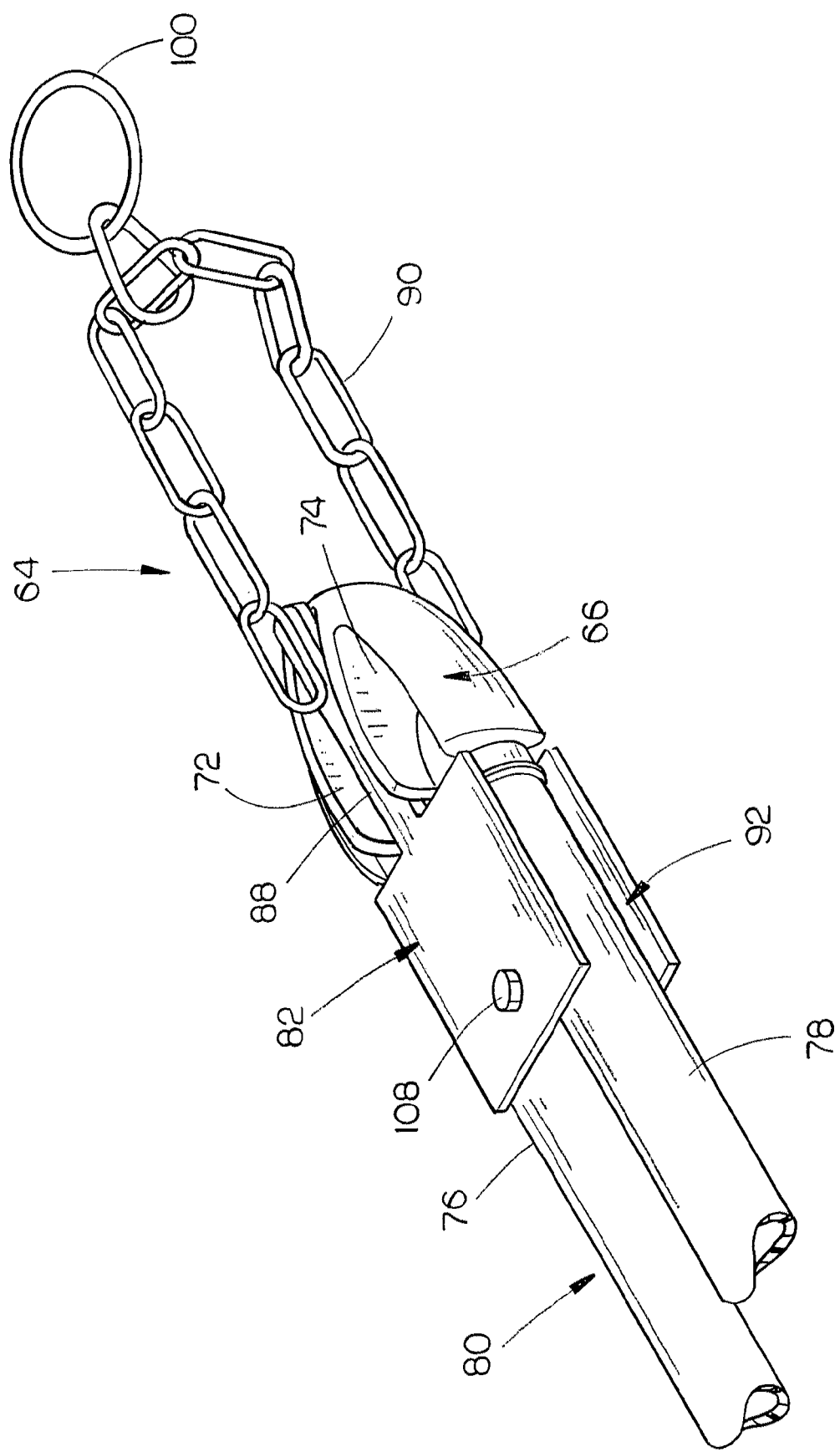
FIG. 5 is a perspective view illustrating the structure of FIG. 4 connected to a pair of heat loop pipes.

FIGS. 4 and 5 illustrate another form of an attachment means which is designated by the reference numeral 64 which is connected to a dual coil fitting 66 having tubular portions 68 and 70 which are fluidly connected together. One type of dual coil fitting is the dual coil fitting illustrated in U.S. Design Pat. No. D498,771 which has spaced-apart upstanding ribs 72 and 74 at its upper side. Dual coil fitting 66 has identical downwardly extending ribs at its underside. Tubular portions 68 and 70 of dual coil fitting 66 are fluidly connected to heat loop pipes 76 and 78 respectively to form a heat loop 80.

Attachment means 64 includes an upper plate member 82 having a trailing or rearward end 84 and a forward end 86. A finger-like member 88 extends forwardly from the forward end 86 of plate member 82 and has one end of the flexible link-type chain 90 secured thereto at 92 by welding or any other convenient means. The numeral 94 refers to a lower plate member having a trailing or rearward end 94 and a forward or leading end 96. A finger-like member 98 extends forwardly from the forward end 96 of plate member 92. The other end of chain 90 is secured to the underside of member 98 by welding or the like. Chain 98 has a ring 100 attached thereto as seen in FIG. 4. Plate member 82 has a bolt opening 102 formed therein while plate member 92 has a bolt opening 104 formed therein. The numeral 106 refers to a hollow sleeve which is positioned between plate members 82 and 92. Bolt 108 extends downwardly through bolt opening 102, through sleeve 106 and through bolt opening 104. Nut 110 is threadably secured to the lower end of bolt 108.

The heat loops, whether they be heat loops 34 or 80, are installed in the ground as will now be described. The drilling machine 10 is operated to drill a first bore hole 22 in the ground as previously described. The length of the drill string 14 is successively lengthened by connecting the lengths of drill pipes 12 together in conventional fashion. When the bore hole 22 has been drilled to the desired location, the drill string 14 is removed from the bore hole 22. Assuming that attachment means 26 is going to be utilized, the plate member 36 is positioned on the top of dual coil fitting 28 so that the upstanding rib 35 is received in the slot 42. Plate member 48 is then positioned at the underside of dual coil fitting 28 so that the downwardly projecting rib of dual coil 28 is received in the slot 54. Bolt 60 is then extended downwardly through bolt opening 47, sleeve 48 and bolt opening 56. Nut 62 is then tightened onto bolt 60 so that the dual coil fitting 28 is firmly held in place between the upper plate member 36 and the lower plate member 48.

Figure 6:
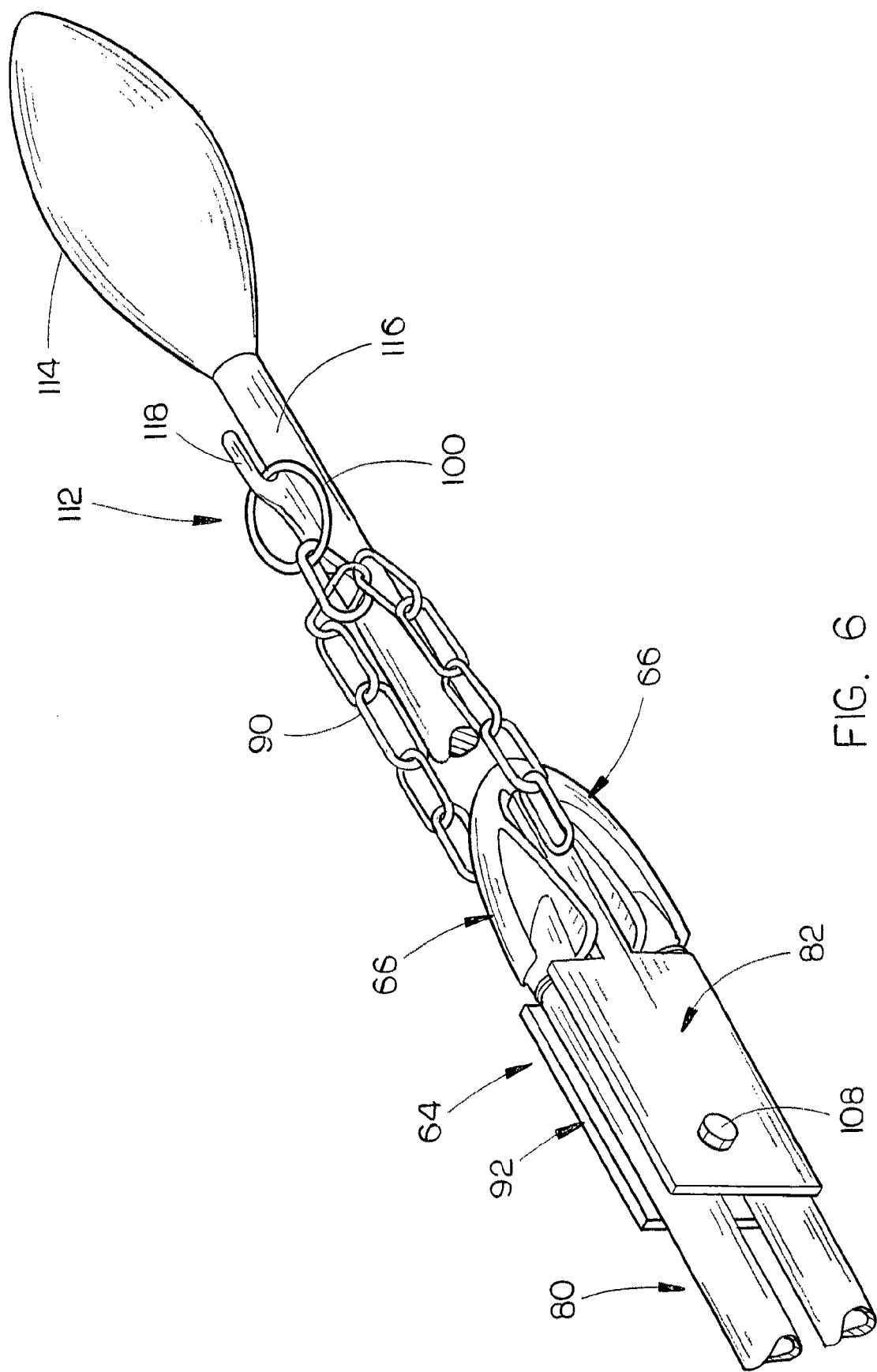
FIG. 6 is a perspective view illustrating the embodiment of FIG. 5 being attached to a hook on the shaft of the head member assembly.
Figure 7:
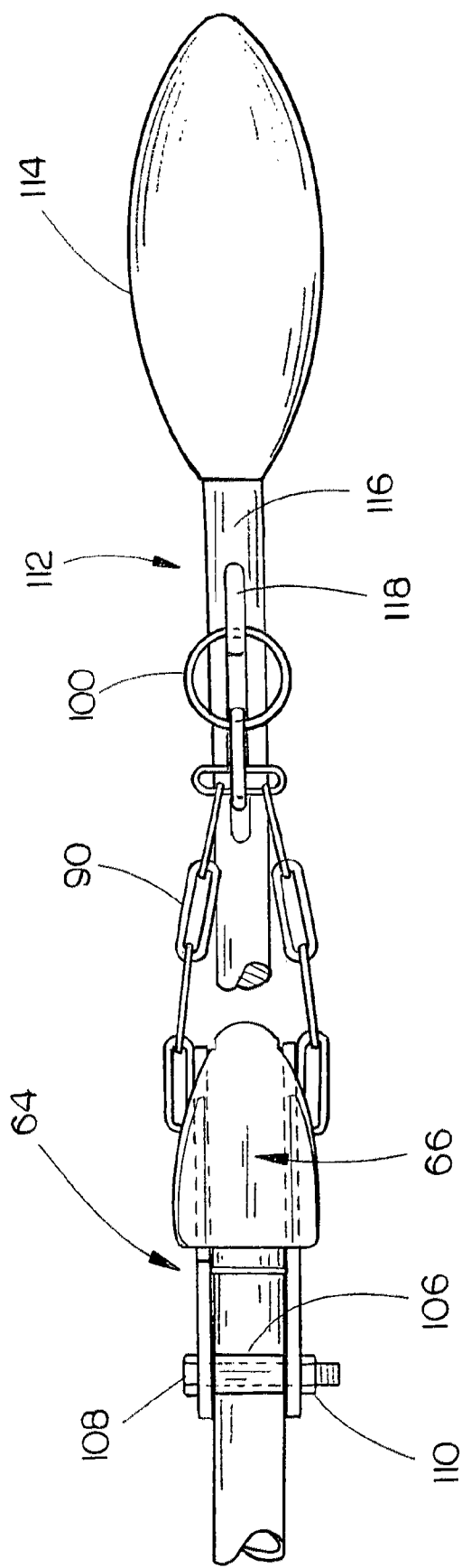
FIG. 7 is a top view of the structure of FIG. 6.

An elongated head member assembly 112 is then provided which includes an enlarged head portion 114 at its distal end and a shaft or pipe section 116 which extends rearwardly therefrom. The rearward end of shaft 116 is threadably secured to the distal end of the drill pipe string 14. The assembly 112 includes a forwardly presented hook 118 which is attached to the shaft 116 as illustrated in FIG. 6. The ring 46 of chain 43 is then looped onto the hook 118. The drill string 114 is then extended downwardly and outwardly through the bore hole 22 to the predetermined location with the distal end of the heat loop 34 being pulled through the bore hole 22 by the attachment means 26 as seen in FIG. 8. When the heat loop 34 has been positioned at the predetermined location in the bore hole 22, the drill string 14 is then removed from the bore hole which causes the ring 46 to disconnect from the hook 118 as seen in FIG. 9 leaving the heat loop 34 in the desired position in the bore hole. As the enlarged head portion 114 is moved rearwardly past the dual coil fitting 28, the enlarged head portion 114 presses the dual coil fitting 28 and the distal end of the heat loop 34 into the side wall of the bore hole 22 to firmly position the heat loop 34 in the bore hole 22.

If the attachment means 64 is utilized, the plate members 82 and 92 are positioned on opposite sides of the dual coil fitting 66 so that the member 88 is received between the upstanding ribs 72 and 74 and so that the member 98 is received between the downwardly extending ribs at the underside of dual coil fitting 66. Bolt 108 is then extended downwardly through bolt opening 102 in plate member 82, through sleeve 106 and through bolt opening 104 in plate member 92. Nut 110 is then threadably secured to bolt 108 to securely attach the attachment means 64 to the dual coil fitting 66 which has the pipes 76 and 78 secured thereto. FIG. 6 illustrates the attachment means 64 being used to attach the dual coil fitting to the hook member 118 by way of the chain 90. The attachment means 64 functions identically to attachment means 26 but is designed to accommodate a slightly differently configured or sized dual coil fitting.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An attachment means for connecting a geothermal heat loop, including a pair of pipes having distal ends fluidly connected together by a dual coil fitting, with the dual coil fitting having a forward end, a rearward end, a first side and a second side, to the forward end of a drill pipe string having a head member with a hook-like member thereon, comprising:
   a first plate having a forward end and a rearward end;
   said first plate being positioned on the pair of pipes rearwardly of the dual coil fitting;
   a first elongated finger, having forward and rearward ends, extending forwardly from said forward end of said first plate;
   said first finger being positioned at the first side of the dual coil fitting;
   a second plate having a forward end and a rearward end;
   said second plate being positioned on the pair of pipes rearwardly of the dual coil fitting whereby said first and second plates embrace the pair of pipes;
   a second elongated finger, having forward and rearward ends, extending forwardly from said forward end of said second plate;
   said second finger being positioned at the second side of the dual coil fitting;
   a bolt extending through said first plate, thence between the pair of pipes, and thence through said second plate to clamp said first and second plates to the pair of pipes;
   an elongated chain having first and second ends;
   said first end of said chain being secured to said first finger;
   said second end of said chain being secured to said second finger;
   said chain being configured so as to be connected to a hook-like member on the head member whereby forward movement of the drill pipe string will cause the dual coil fitting and the pair of pipes to be pulled forwardly and whereby rearward movement of the drill pipe string will cause said chain to disconnect from the hook-like member on said head member.

2. An attachment means for connecting a geothermal heat loop, including a pair of pipes having distal ends fluidly connected together by a dual coil fitting, with the dual coil fitting having a forward end, a rearward end, a first side and a second side, to the forward end of a drill pipe string having a head member with a hook-like member thereon, comprising:
   a first plate having a forward end and a rearward end;
   said rearward end of said first plate being positioned on the pair of pipes at the distal ends thereof;
   said forward end of said first plate being positioned on the rearward end of the dual coil fitting at the first side of the dual coil fitting;
   a second plate having a forward end and a rearward end;
   said rearward end of said second plate being positioned on the pair of pipes at the distal ends thereof;
   said forward end of said second plate being positioned on the rearward end of the dual coil fitting at the second side of the dual coil fitting whereby said first and second plates embrace the distal ends of the pair of pipes and the rearward end of the dual coil fitting;
   a bolt extending through said first plate, thence between the pair of pipes, and thence through said second plate to clamp said first and second plates to the pair of pipes;
   an elongated chain having first and second ends;
   said first end of said chain being secured to said first plate;
   said second end of said chain being secured to said second plate;
   said chain being configured so as to be connected to a hook-like member on the head member whereby forward movement of the drill pipe string will cause the dual coil fitting and the pair of pipes to be pulled forwardly and whereby rearward movement of the drill pipe string will cause said chain to disconnect from the hook-like member on said head member.

* * * * *